United States Patent

[11] 3,632,458

[72] Inventors Harold E. Filter
Midland;
Don L. Stevens, Sanford, both of Mich.
[21] Appl. No. 726,091
[22] Filed May 2, 1968
[45] Patented Jan. 4, 1972
[73] Assignee The Dow Chemical Company
Midland, Mich.

[54] SELF-EXTINGUISHING SOLID PROPELLANT FORMULATIONS
8 Claims, No Drawings
[52] U.S. Cl...................................................... 149/19,
149/20, 149/40, 149/41
[51] Int. Cl...................................................... C06d 5/06

[50] Field of Search............................................ 149/19, 20,
29–32, 40, 44, 41

[56] References Cited
UNITED STATES PATENTS
3,027,284 3/1962 Sammons.................... 149/19
3,228,813 1/1966 Morana....................... 149/19 X

*Primary Examiner*—Benjamin R. Padgett
*Attorneys*—Griswold & Burdick and C. Kenneth Bjork

ABSTRACT: A self-extinguishing solid propellant composition comprising a phosphorous-oxygen containing compound, a polymeric binder-fuel, an oxidizing agent, and a predetermined amount of particulate aluminum.

SELF-EXTINGUISHING SOLID PROPELLANT FORMULATIONS

BACKGROUND OF THE INVENTION

The present invention discloses a novel self-extinguishing, solid propellant system composed of fuel, oxidizer, a flame-retardant additive which confers pressure-sensitive extinguishability upon a cured propellant grain, and a binder consisting of a polymeric resin prepared from acid salts of amine-terminated polyglycols.

Heretofore, various oxidizer and fuel additives have been combined with polymeric binder systems and the products have been employed as solid propellants for rockets and other projectiles. These formulations have shown smooth burning, good energy generation and other characteristics desirable in solid fuel propellants. However, a common difficulty with all solid fuel propellants heretofore employed has been the difficulty of extinguishing and restarting the solid fuel propellant system. This is indeed a serious handicap as it reduces considerably the inflight maneuverability of a rocketlike projectile and necessitates extreme accuracy in preflight calculations since once the rocket has been found to deviate from the predetermined projectory, its course cannot readily be corrected through extinction and restarting of the solid fuel propellant system. Also, on interplanetary or transcontinental missions, it is desirable that the propellant system extinguish and restart to conserve fuel or even to permit rendezvous and docking in space with a capsule. The ability to depart from the aforesaid space capsule without the inconvenience and expense of acquiring a new fuel system is a great advantage.

It is a principal object of the present invention to provide a novel solid propellant which can be extinguished and restarted during use.

It is also an object of the present invention to provide a chemical formulation which yields a unique pressure-sensitive, easily extinguished solid propellant.

It is another object of the present invention to provide a solid propellant which is readily extinguished in the pressure range of from about 35 to 100 p.s.i., yet can be restarted and which burns readily and smoothly to produce a combustion pressure of from about 200 to about 500 p.s.i.

It is a further object of the present invention to provide a formulation which can be easily cast or extruded to produce a solid propellant fuel of predetermined configuration.

It is still another object of the present invention to provide a solid propellant formulation wherein the ratios of fuel, oxidizer, and binder can be varied over a wide range while maintaining the crucial quality of controlled and specific extinguishability.

These and other advantages readily will become apparent from the following description of the invention.

SUMMARY OF THE INVENTION

The present invention is a solid propellant composition which comprises on a weight basis from about 9 to about 24 percent of a polymeric binder-fuel, from about 1 to about 6 percent of a curing agent, from about 5 to about 30 percent of a particulate light metal fuel, from about 50 to about 75 percent of an inorganic oxidizer, and from about 0.5 to about 5 percent of a flame-retardant additive which confers pressure-sensitive extinguishability upon the cured propellant grain.

The flame retardant additive employed usually is a phosphorous-oxygen containing compound such as phosphorous pentoxide or ammonium acid phosphate. Also flame retardant inorganic oxides, ammonium compounds, or mixtures thereof can be used.

Binder systems suitable for use in the present composition consist generally of cross-linking polymers selected from the class consisting of the mono- and diacid salts of diamine terminated polyglycols, diamine terminated polyglycols, polyglycols, trifunctional polyglycols, polytriols, polyesters, polyurethanes, polymeric aliphatic fluorocarbons, and mixtures thereof. Preferably the polymeric binder-fuel is a member selected from the class consisting of polyglycols, diamine terminated polyglycols, monoacid salts of diamine terminated polyglycols, and diacid salts of diamine terminated polyglycols. The polyglycol moiety present in the diamine terminated polyglycols and/or their acid salts generally varies in molecular weight from about 200 to about 2,400; this may consist of straight or branched chain aliphatic glycols such as polyethylene glycol, polypropylene glycol and polybutylene glycol, trifunctional polyglycols such as polyhydroxypropylglycerine, polytriols derived from ethylene oxide and/or propylene oxide, polymerized glycols such as hexylene glycol, 2-ethyl-1,3-hexanediol, 1,2,6-hexanetriol and the like.

The aluminum fuel component of the present invention consists of flakes of small dimension and finely ground spherical particles of aluminum. Both spherical and flake aluminum are generally present; the weight proportion of the spherical/flake particle can vary and at a maximum is about 20.0/1.0. It has been found that extinguishability is promoted if at least a small portion of the above-mentioned spherical aluminum is present in the composition. The total amount of aluminum employed will vary depending upon the amount of binder used, and the energy production desired.

A wide range of inorganic oxygen containing compounds can be employed in the present invention as oxidizing agents, including, for example, salts such as alkali metal and ammonium nitrates, chlorates, and perchlorates. Optionally, from about one-tenth to about seven-tenths and preferably from about one-third to one-half, based on total weight of the oxidizing agent may be coated with an aliphatic fluorocarbon which may serve to retard interaction between the oxidizer and other components of the solid propellant composition.

The novel solid propellant grains of the present invention are prepared by mixing the polymeric binder-fuel with a predetermined amount of the curing agent or subjecting it to a predetermined amount of the cross-linking promoter. The extinguisher compound, oxidizer, and aluminum are added and the resulting blend is mixed until a homogeneous liquid or plastic mass results. The mass can then be easily cast or extruded into the predetermined configuration after which the curing process takes place. The temperature range employed in curing the propellant mixture can vary from about room temperature to about 125° C. The time-range needed for curing can vary from several minutes to about 48 hours or more. The actual time of cure to be employed for a given reaction mixture will depend upon the nature and ratio of reactants, curing temperature and, to some extent, on the ultimate properties desired in the final cross-linked product.

A wide range of compounds on cross-linking promoters can be employed with the binder systems described herein. Where a polymeric fluorocarbon binder is used, a suitable curing agent can be selected from among the members of the group consisting of primary, secondary, and tertiary amines, and polyethylene polyamines such as, for example, diethylene triamine and triethylene tetramine. Cross-linking promoters can also be employed with polymeric fluorocarbon binders. For example, a fluoroalkylacrylate polymeric binder can be employed in conjunction with a peroxide cross-linking promoter such as, for example, benzoyl peroxide dibutyryl peroxide, dilauryl peroxide, urea peroxide, succinic acid peroxide, cumene hydroperoxide, and tertiary butyl hydroperoxide.

Where a polyurethane binder is to be employed a suitable curing agent can be selected from the group consisting of aromatic diisocyanates such as for example, 2,4-toluenediisocyanate, 4,4-benzidenediisocyanate, and 1,5-naphthylenediisocyanates, and aliphatic diisocyanates.

Where the polymeric binder is selected from the group consisting of the mono- and diacid salts of diamine terminated polyglycols, mono- and diamine terminated polyglycols, trifunctional polyglycols, polytriols, and polyesters, suitable curing agents are selected from among the members of the group consisting of flexible epoxy-based resins, epoxidized sucrose material, aziridine resins, and mixtures thereof.

Epoxy-based resins such as glycidyl ethers can also be successfully employed as curing agents.

If a fluorocarbon polymeric binder-amine curing agent system is to be employed, the ratio of curing agent to binder ranges generally from about 0.5 to about 2 based on the fluorine equivalent/amine nitrogen equivalent ratio required stoichiometrically for complete cross-linking, i.e., a ratio of 1. Preferably the ratio should be about 1.0.

If a polyurethane binder-isocyanate curing agent system is to be employed, the hydroxyl equivalent/isocyanate equivalent ratio ranges from about 0.75 to about 1.25 and preferably is about 1.0.

If the polymeric binder employed is a member selected from the group consisting of mono- and diacid salts of amine terminated polyglycols, triamine terminated polyglycols, and diamine terminated polyglycols, and assuming that said member is cured with an epoxy-based resin which is a member of the group of such resins set forth hereinabove, the epoxide equivalent/amine hydrogen equivalent ratio ranges from about 0.5 to about 2.5.

DESCRIPTION OF PREFERRED EMBODIMENTS

In a preferred embodiment of the present invention, the polymeric binder is a diamine terminated polyglycol wherein the polyglycol moiety has a molecular weight of about 2,000 and is a member selected from the class of polypropylene glycol, polybutylene glycol, and polyethylene glycol. The curing agent is a nonhalogenated epoxy-based resin or a combination of such resins, e.g., a nonhalogenated, epoxy resin. The solid propellant composition consists of, by weight, from about 16 to about 22 percent of the system of polymeric binder and curing agent wherein the epoxide equivalent/amine hydrogen equivalent ratio ranges from about 0.25 to about 1.5.

In addition to the hereinabove described polymeric binder and curing agent system, the formulation consists preferably of from about 1 to about 3 percent by weight of a flame-retardant, phosphorous-oxygen containing compound selected from the group consisting of phosphorous pentoxide ($P_2O_5$) and monoammonium acid phosphate ($NH_4H_2PO_4$), from about 12 to about 20 percent by weight of a mixture of particulate spherical and flake aluminum, and from about 55 to about 70 percent by weight of ammonium perchlorate oxidizer.

The size of the particulate aluminum ordinarily employed varies from about 5 microns to about 590 microns (i.e., a maximum of about 30 mesh U.S. Standard Sieve Series). A preferred particle size range however is from about 5 to about 50 microns.

To fabricate the unique composition of the present invention the components referred to hereinabove, including the polymeric binder and curing agent usually are combined in the following manner.

First the binder and curing agent are blended together to form a liquid or semiliquid mixture. Secondly, the aluminum, oxidizer and phosphorous-oxygen compound are added to the binder and curing agent. The resulting blend is mixed until a homogeneous mass is obtained. The resulting homogenized mass is cast or extruded into a predetermined shape after which curing takes place at from about room temperature to about 80° C. The time of cure can be varied greatly, but from about 1 hour to about 30 hours generally has been found to be sufficient.

Employing the reagents and processes described hereinabove, a unique solid propellant composition can be prepared which possesses the following advantages. The present solid propellant formulation can be readily extinguished by a decrease in pressure in the combustion chamber and ignited again, or ignited initially by an electrical impulse. The means employed to vary the pressure in the combustion chamber includes a nozzle, vent, or other opening into the combustion chamber in which the size of the opening can be controlled and varied to achieve the desired extinction or ignition.

More specifically, in rocket engines wherein a solid fuel propellant system is presently employed, the gases generated by the burning solid fuel produce a constant gas pressure in the combustion chamber of from about 200 to 500 pounds per square inch (p.s.i.). The solid fuel formulations of the present invention generate pressures substantially equivalent to those produced by the presently employed engines, and in addition they can be readily extinguished by lowering the pressure in the combustion chamber by those means recited hereinabove. A lowered pressure of about 35 p.s.i. is especially advantageous in that this varies sufficiently from the normal operating pressures of 200–500 p.s.i. such that the solid propellant will not be inadvertently extinguished.

The formulations of the present invention in addition to possessing the above unique advantages also compare favorably to the presently employed solid propellants in other vital respects. The present formulations are hard, durable substances not easily shaken apart by sudden jolts, starts, stops, etc. In addition, these compounds are found to burn with great uniformity over the desired range of temperatures and pressures. The combustion energies produced by formulations of the present invention have been found to compare favorably with those energies developed by presently employed solid fuel systems. Additionally, the binder additive system of the present invention can be reduced to about 16 percent of the total formulation weight without impairing the desirable pressure-sensitive extinction properties of the formulation. This permits more fuel and/or oxidizer to be added to the formulation to increase the energy and power produced therein.

The following examples will serve to further illustrate the present invention but are not meant to limit it thereto.

EXAMPLE 1

About 1.025 gram of a Dow brand epoxy resin, designated Dow Epoxy Resin 736, and about 1.025 gram of a Dow brand epoxy resin designated Dow Epoxy Resin 332 were added to about 9.35 grams of the monoperchlorate salt of a diamine terminated polypropylene glycol of about 2,000 molecular weight. To this mixture was added about 1.8 gram of ammonium phosphate ($NH_4H_2PO_4$), about 8.4 grams of aluminum spheres about 5 microns in diameter, about 2.4 grams of aluminum flakes about 5 microns in size, about 18.9 grams of ammonium perchlorate, and about 18.9 grams of ammonium perchlorate coated with Viton brand fluorocarbon. This provided a composition containing on a weight basis about 1.66 percent of Dow Epoxy Resin 736, about 1.66 percent of Dow Epoxy Resin 332, about 15.3 percent of a diamine terminated polypropylene glycol, about 2.91 percent of ammonium phosphate, about 17.50 percent of aluminum fuel, about 30.6 percent of noncoated ammonium perchlorate, and about 30.6 percent of fluorocarbon-coated ammonium perchlorate. It will be noted that the binder-fuel system consisting of the epoxy-based resins and diamine terminated polyglycol provided about 19 percent of the total formulation weight. Also the epoxide equivalent/amine hydrogen equivalent proportions are 0.455/1.0.

The resulting mass was mixed until a substantially homogeneous blend was established. The homogeneous blend was cast into cylindrical tubes and cured at a temperature of 50° C. for about 20 hours to produce a cylindrical, hard, void-free solid fuel propellant strand 5 inches long by 0.75 inch in diameter and weighing about 30 grams.

The extinguishability of the cylindrical strand of solid propellant was tested by placing it in a window bomb strand burner substantially identical to the one depicted by the FIGURE of the drawing. The strand was placed in the burner so that it could be observed through the glass window. The bomb was pressured to 100 p.s.i. with nitrogen, whereupon the strand was ignited. The pressure was decreased by opening the exhaust valve on said strand burner, and the pressure at which the propellant ceased to burn was obtained from a pressure gauge attached to said strand burner. The strand ceased to burn between about 35 p.s.i. and about 40 p.s.i.

EXAMPLE 2

Following the process described in example 1, other compositions were prepared in which all ingredients were of the same type as those used in example 1. However, the proportions were varied both in regard to the relative quantities of spherical to flake aluminum fuel and the untreated to treated ammonium perchlorate oxidizer. The results of these studies are set forth in table 1.

TABLE I

| Sample No. | Fuel composition, spherical/ flake weight proportions | Oxidizer composition, untreated/ treated weight proportions | Additives | Extinguishability |
| --- | --- | --- | --- | --- |
| 1 | 3.5/1.0 | 1.0/1.0 | 3% NH₄H₂PO₄ | Excellent.ʸ |
| 2 | 8.0/1.0 | 1.0/1.0 | Same as above | Do. |
| 3 | 17.0/1.0 | 1.0/1.0 | ...do... | Fair. |
| 4 | 1.0/0.0 | 1.0/1.0 | ...do... | Do. |
| 5 | 3.5/1.0 | 1.5/1.0 | ...do... | Excellent. |
| 6 | 3.5/1.0 | 2.15/1.0 | ...do... | Do. |
| 7 | 3.5/1.0 | 3.2/1.0 | ...do... | Do. |

ʸ Excellent indicates that the sample extinguished at 35-100 p.s.i.

The results obtained in examples 1 and 2 establish conclusively the unique extinguishable nature of solid propellant formulations disclosed by the present invention.

Various modifications can be made in the present invention without departing from the spirit or scope thereof for it is to be understood that we limit ourselves only as defined in the appended claims.

We claim:

1. A solid propellant composition comprising on a weight basis:
   a. from about 0.5 to about 5 percent of a flame-retardant compound selected from the group consisting of phosphorous pentoxide or ammonium acid phosphate, as propellant extinguisher,
   b. from about 5 to about 30 percent of particulate aluminum as fuel,
   c. about 50 to about 75 percent by weight of a member selected from the group consisting of ammonium perchlorate, ammonium nitrate, or mixtures thereof as oxidizer, and
   d. from about 10 to about 30 percent of a cross-linked polymeric binder-fuel, consisting of (1) polyurethane cured with an aromatic or aliphatic diisocyanate, wherein the hydroxyl equivalent/isocyanate equivalent ratio is from about 0.75 to about 1.25; or (2) a polymeric fluorocarbon cured with a primary, secondary, or tertiary amine, or a polyethylene polyamine, and wherein the fluorine equivalent/amine nitrogen equivalent ratio is from about 0.5 to about 2.

2. The solid propellant composition defined in claim 1 and including a cross-linked polymeric binder-fuel consisting of a polymeric fluorocarbon binder and a peroxide cross-linking promoter.

3. The solid propellant composition comprising on a weight basis:
   a. from about 0.5 to about 5 percent of a flame-retardant phosphorous-oxygen compound, selected from the group consisting of phosphorous pentoxide or ammonium acid phosphate,
   b. from about 5 to about 30 percent by weight of particulate aluminum fuel of from about 5 to about 590 microns in size,
   c. from about 50 to about 75 percent by weight of finely particulated ammonium perchlorate, ammonium nitrate or mixtures thereof as oxidizer, and
   d. from about 10 to about 30 percent by weight of a cross-linked polymeric binder-fuel selected from the group consisting of polyglycols, diamine terminated polyglycols, monoacid salts of diamine terminated polyglycols, and diacid salts of diamine terminated polyglycols.

4. The propellant composition defined in claim 3 and including a cross-linked polymeric binder-fuel consisting of a member selected from the group consisting of the mono- and diacid salts of diamine terminated polyglycols, diamine terminated polyglycols, and monoamine terminated polyglycols, as polymeric binder, and a member selected from the group consisting of liquid epoxy resins, epoxidized carbohydrates, and mixtures thereof, as curing agents, wherein the epoxide equivalent/amine hydrogen equivalent ratio ranges from about 0.75 to about 1.5.

5. The formulation as defined in claim 3 wherein the phosphorous-oxygen flame-retardant compound is a member selected from the group consisting of monoammonium phosphate or phosphorous pentoxide, the particulate aluminum ranges in size from about 5 to about 50 microns, the polymeric binder-fuel is a compound selected from the class consisting of polyglycols, diamine terminated polyglycols or monoacid salts of diamine terminated polyglycols wherein the polyglycol moiety has a molecular weight of from about 200 to about 2,400 and is selected from the class consisting of polypropylene glycol, polybutylene glycol, and polyethylene glycol, and the curing agent is a nonhalogenated, epoxy resin.

6. The formulation as defined in claim 3 wherein by weight about 3 percent is monoammonium phosphate, about 13 percent is particulate aluminum fuel, about 16 percent is the perchlorate salt of diamine terminated polypropylene glycol wherein the polypropylene glycol moiety has a molecular weight of about 2,000, about 64 percent is finely particulated potassium perchlorate, and about 4 percent is a nonhalogenated epoxy resin.

7. The formulation as defined in claim 3 wherein from about one-tenth to about seven-tenths by weight of the ammonium perchlorate oxidizer is coated with a polyaliphatic fluorocarbon.

8. The formulation as defined in claim 3 wherein the particulate aluminum fuel consists of a mixture of spherical and flake particles and wherein the spherical/flake weight proportion is a maximum of about 20/1.

* * * * *